United States Patent Office 3,623,236
Patented Nov. 30, 1971

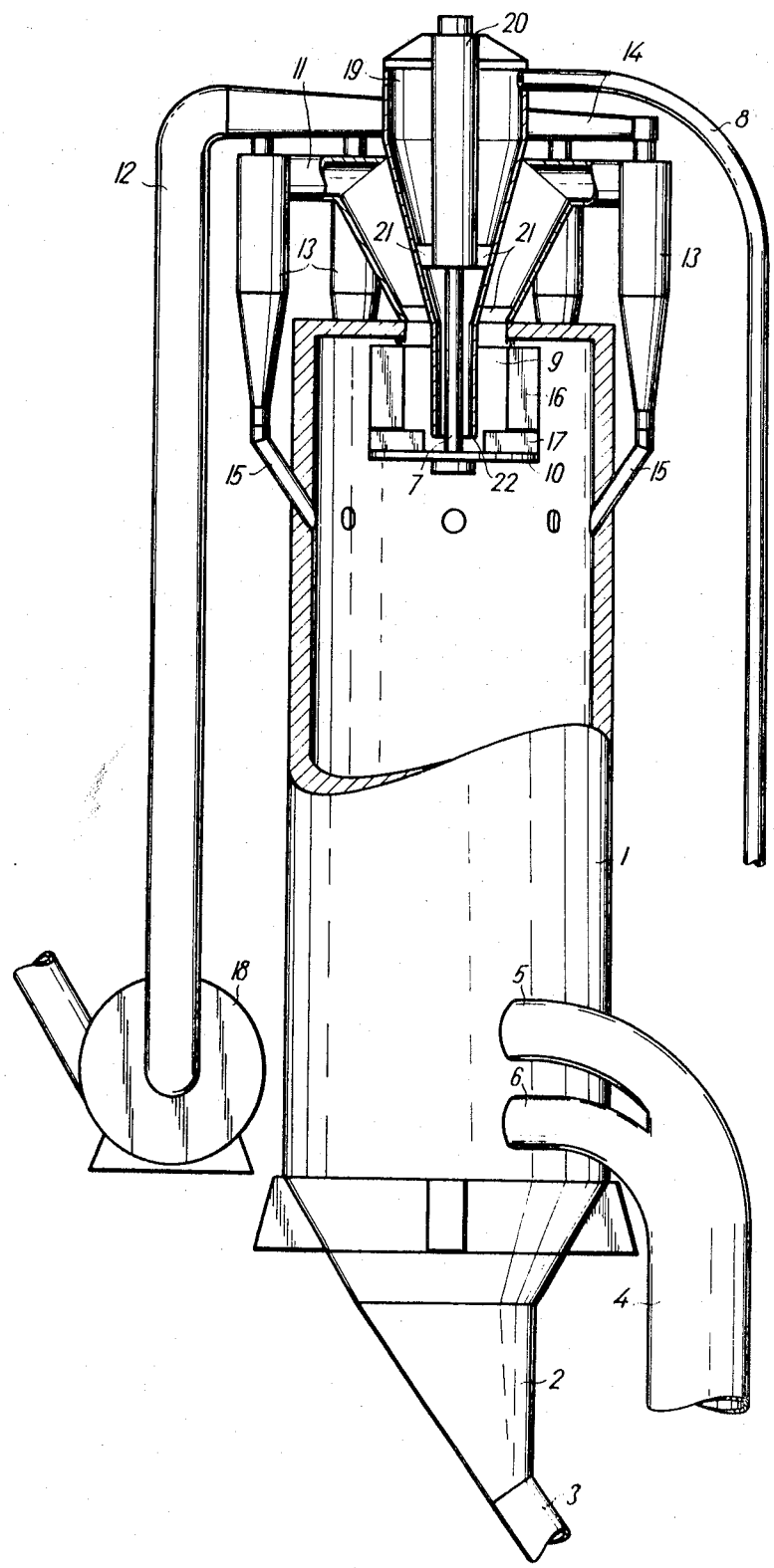

3,623,236
ARRANGEMENT FOR PREHEATING OF PULVERULENT MATERIAL, PARTICULARLY OF RAW CEMENT POWDER
Zdeněk Zacpal, Horni Mostenice, and Petr Němeček, Prerov, Czechoslovakia, assignors to Prerovske strojirny, narodni podnik, Prerov, Czechoslovakia
Filed Nov. 21, 1969, Ser. No. 878,841
Int. Cl. F27b 15/00
U.S. Cl. 34—57 R                                    5 Claims

ABSTRACT OF THE DISCLOSURE

A shaft heat exchanger for pulverulent material with an inlet for hot gases at the bottom and an inlet for the material to be preheated at the top is provided at the top of the shaft with a rotary shutter separator serving simultaneously as distributor of the raw material in the interior of the shaft. The gas outlet of said rotary shutter separator is connected to cyclone separators arranged along the circumference of the top of the shaft. The solid particles separated in the cyclone separators are returned directly back into the shaft.

BACKGROUND OF THE INVENTION

This invention relates to an arrangement for pre-heating of pulverulent material and particularly of raw cement powder for the dry manufacturing of cement clinker.

All types of heat exchangers require that the outgoing waste gases which have transferred all useful heat content to the raw material, be to the highest degree possible deprived of powder particles in suspension. The heat content of the waste gases is thusreduced, the heat efficiency of the preheating unit increased and the costs for cleaning of waste gases prior to their discharge into the surrounding atmosphere reduced, with a subsequent improvement in environmental hygienic conditions. It is commonly known, that the separation of powder particles from gases discharged from shaft heat exchangers can be accomplished by rotating separating shutters having vertical rotation axis, arranged in the upper part of the shaft. This shutter in addition to the separation of the powder particles also effects a perfect dispersion of the newly supplied raw material, so that the heat transmission process is substantially intensified, whereby the investment and maintenance costs are held rather low. A drawback occurs in that a relatively small amount of power remains in the gases behind the heat exchanger, which is generally separated in an electrostatic filter prior to discharging the gases into the atmosphere. This circumstance increases the load on the operation of this filter and is disadvantageous in that the heat of the separated powder is not fully utilized, as the powder is conveyed back by way of complicated tracks and its heat content is in the course of this transport lost by radiation and convection into the atmosphere.

SUMMARY OF THE INVENTION

It is an object of this invention to reduce substantially the content of powder particles in the output of a shaft type heat exchanger.

It is another object of this invention to utilize all heat contained in powder particles leaving a rotating shutter separator at the top of the shaft type heat exchanger.

Having these and other objects in view we provide between the output of a rotating shutter separator at the top of a shaft type heat exchanger and the waste gas conduit of said heat exchanger a cyclone separator stage, returning the thus separated solid particles directly back into the heat exchanger.

DESCRIPTION OF THE DRAWING

An exemplary embodiment is schematically shown in the accompanying drawing in elevation with parts of the arrangement in section.

DESCRIPTION OF PREFERRED EMBODIMENT

The shaft heat exchanger with the improvements according to this invention comprises a preheating shaft 1, the lower part of which passes into a funnel 2 connected by means of the conduit 3 with a burning kiln, not indicated on the drawing. The hot combustion gases from the kiln enter the lower part of the preheating shaft 1 by way of a channel 4 terminating tangentially near the bottom of the shaft 1 by two separate branches 5 and 6. A rotary shutter separator 9 is provided in the upper part of the preheating shaft 1, having separating blades 16 and a distributing disk 10 with distributing blades 17. A number of cyclone separators is provided around the circumference at the top of the shaft 1, the tangential inlet of said cyclone separators 13 being connected with the top of the rotary shutter separator 9 by way of an extension 11 on top of the shaft 1. In the center of the extension 11 is a supply hopper 19 for the material to be preheated, into which supply hopper 19 a supply conduit 8 terminates tangentially. The bottom of the supply hopper 19 narrows into a vertical conduit 22 terminating above the distributing disk 10 of the rotary shutter separator 9. A bearing box 20 for the shaft 7 of the rotary shutter separator 9 is mounted within the supply hopper 19, the axial position of which with respect to the supply hopper 19 and with respect to the extension 11 is secured by centering fins 21. The discharge conduits 15 from the cyclone separators 13 terminate directly in the upper part of the preheating shaft 1. The gas outlets from the cyclone separators 13 are connected by way of a collecting tubing 14 with the gas discharge conduit 12, to which a fan 18 for waste gases is connected.

The whole system operates so that hot combustion gases supplied via the channel 4 separate into two branches 5 and 6 terminating tangentially near the bottom of the preheater shaft 1. The combustion gases are thus rotating and ascend in the preheating shaft 1 until they pass between the separating blades 16 of the rotary shutter separator 9. Due to the passage of the gases between the shape separating blades 16 the momentum of the gases is changed, resulting in a rotation of the rotary shutter separator 9 together with the distributing disk 10 in the direction of rotation of the gases in the shaft 1. The gases enter, after passage between the separating blades 16, the extension 11, wherefrom they are sucked off by the fans 18 over the cyclone separators 13, the collecting tubing 14 and the discharge conduit 12.

The raw material to be preheated is supplied via the supply conduit 8 terminating tangentially in the upper part of the hopper 19. The raw material drops through the vertical conduit 22 onto the distributing disk 10 where it is uniformly distributed by the distributing blades 17 in the direction of rotation of the gases along the internal circumference of the preheating shaft 1. The raw material and the gases are thoroughly mixed in the upper part of the preheating shaft 1. At first the major part of the raw material floats in the gases between the separating blades 16 of the rotating shuter separator 9. Due to the rotation of the shutter separator 9 the raw material taken along by the gases is, by contact with the curved surface of the separating blades 16 and due to centrifugal forces, continuously returned back to the internal circumference of the preheating shaft 1, while the partially cleaned gases proceed into the extension 11 and subsequently to the cyclone separators 13, wherefrom they are, deprived of powder particles and discharged over the smoke fan 18 for further processing. The powder particles separated in the cyclone separators 13 are returned over the discharge conduits 15 to the top part of the shaft 1.

The newly supplied raw material continuously thickens the gases in the upper part of the preheating shaft 1 so that after a certain time the carrying capacity of the gases is exceeded and the perfectly dispersed raw material starts to drop against the stream of the ascending rotating gases towards the bottom of the shaft. The raw material proceeds against more and more hot gases, and absorbs rather intensively the heat from the gases and is thus preheated. The preheated raw material gathers in the funnel 2 and is supplied via the conduit 3 to the burning device.

In the arrangement according to this invention the powder particles recovered by the battery of cyclone separators is returned directly, without use of any intermediate conveying means, back into the shaft.

As the investment costs for electrostatic separators are substantially lower and the whole arrangement requires less space, the result is a saving of investment costs.

As the battery of cyclone separators does not cause stress, to any particular degree, to the shaft, no substantial rise in price of the heat exchanger, nor any difficulties in the self supporting design of the shaft result.

We claim:

1. An arrangement for preheating of pulverulent material particularly of raw cement powder comprising in combination a preheating shaft,
    a supply channel for the supply of hot gases near the bottom of said shaft, said channel terminating tangentially in said shaft and causing said gases to enter therein in an ascending rotary direction,
    a rotary shutter separator mounted at the top of said shaft coaxial with the vertical axis of said shaft and rotatingly coacting with said rising gases,
    said rotary shutter separator provided with a central inlet for the treated raw material at the top and with distributing means for distributing said raw material uniformly along the internal circumference at the top of said shaft, said rotary shutter separator being also provided with substantially radial inlets for the rotating ascending gases with otulets for said gases at the top,
    a plurality of cyclone separators arranged at the top of said shaft with a tangential inlet and with outlets for separated gases and for solid material,
    the tangential inlets of said cyclone separators being connected to the outlets from said rotary shutter separators,
    the outlets for separated solid material of said cyclone separators extending to said shaft and then terminating at the circumference thereof at the top of said shaft and below said shutter separator, and
    discharge means for the preheated raw material located at the bottom of said shaft below said supply channel.

2. An arrangement as set for in claim 1, said cyclone separators distributed uniformly along the external circumference at the top of said shaft.

3. The arrangement as set forth in claim 2, wherein said rotating shutter is provided with axial fins adjacent said radial inlets for coaction with said rising gases in said shaft for causing rotation of said rotary shutter.

4. The arrangement as set forth in claim 2, wherein said means for distributing said raw material comprises a disk coaxially mounted on a shaft extending through said rotary shutter separator and rotating conjointly therewith, said disk having fin means for discharging said raw material.

5. The arrangement according to claim 2, wherein said supply channel comprises a pair of tubular members arranged axially with respect to each other and each extending tangentially to said shaft.

References Cited

UNITED STATES PATENTS

| 2,658,615 | 11/1953 | Ebersole | 34—570 X |
| 3,102,719 | 9/1963 | Zacpal et al. | 34—57 X |
| 3,135,588 | 6/1964 | Helming | 34—57 E |

CHARLES J. MYHRE, Primary Examiner

U.S. Cl. X.R.

263—21 R, 32 R